US010236094B2

(12) United States Patent
Hong et al.

(10) Patent No.: US 10,236,094 B2
(45) Date of Patent: Mar. 19, 2019

(54) METHOD OF MANUFACTURING AN ELECTRODE FOR A SURGE ARRESTER, ELECTRODE AND SURGE ARRESTER

(71) Applicant: EPCOS AG, Munich (DE)

(72) Inventors: Jiaping Hong, Xiaogan (CN); Yu Zhang, Xiaogan (CN); Zhipeng Fang, Xiaogan (CN); Wolfgang Däumer, Zeuthen (DE); Frank Werner, Berlin (DE)

(73) Assignee: EPCOS AG, München (DE)

( * ) Notice: Subject to any disclaimer, the term of this patent is extended or adjusted under 35 U.S.C. 154(b) by 201 days.

(21) Appl. No.: 15/108,546

(22) PCT Filed: Jan. 28, 2015

(86) PCT No.: PCT/EP2015/051733

§ 371 (c)(1),
(2) Date: Jun. 27, 2016

(87) PCT Pub. No.: WO2015/124393

PCT Pub. Date: Aug. 27, 2015

(65) Prior Publication Data

US 2016/0329125 A1 Nov. 10, 2016

(30) Foreign Application Priority Data

Feb. 18, 2014 (EP) .................................... 14155575

(51) Int. Cl.
*B32B 15/00* (2006.01)
*H01B 5/02* (2006.01)
(Continued)

(52) U.S. Cl.
CPC ................ *H01B 5/02* (2013.01); *C25D 3/12* (2013.01); *C25D 7/00* (2013.01); *H01C 7/12* (2013.01); *H01C 17/28* (2013.01); *H01T 21/00* (2013.01)

(58) Field of Classification Search
None
See application file for complete search history.

(56) References Cited

U.S. PATENT DOCUMENTS 4,724,052 A * 2/1988 Nidola ................ C25B 11/0478 205/109
6,529,361 B1 3/2003 Petschel et al.
(Continued)

FOREIGN PATENT DOCUMENTS

DE 19741658 A1 3/1999
DE 102005036265 A1 2/2007
(Continued)

OTHER PUBLICATIONS

Ceramic to Metal Bonding, Mar. 22, 2013, S-Bond Technologies LLC (Year: 2013).*
About Solder, Jan. 22, 2014 (Year: 2014).*

*Primary Examiner* — David Sample
*Assistant Examiner* — Mary I Omori
(74) *Attorney, Agent, or Firm* — Slater Matsil, LLP

(57) ABSTRACT

A method for manufacturing of an electrode of a surge arrester, an electrode and a surge arrester are disclosed. In an embodiment, the method includes positioning an electrode body in an electrochemical cell with and an electrolyte solution for a nickel deposition. The electrolyte solution includes at least one or more of magnesium sulphate, sodium sulphate and sodium chloride and electrolytically coating the electrode body with a coating to form the electrode for the surge arrester. The coating has nickel and the electrolyte
(Continued)

solution is configured such that a surface of the coating includes a reduced wettability.

13 Claims, 2 Drawing Sheets

(51) Int. Cl.

| | |
|---|---|
| ***C25D 7/00*** | (2006.01) |
| ***H01T 21/00*** | (2006.01) |
| ***C25D 3/12*** | (2006.01) |
| ***H01C 7/12*** | (2006.01) |
| ***H01C 17/28*** | (2006.01) |

(56) References Cited

U.S. PATENT DOCUMENTS

2005/0276001 A1* 12/2005 Matsuoka ............ H01C 7/1006
361/306.3
2008/0218082 A1* 9/2008 Boy .......................... H01T 1/20
313/631
2009/0110955 A1 4/2009 Hartmann et al.

FOREIGN PATENT DOCUMENTS

| | | | |
|---|---|---|---|
| JP | 5029517 | A | 2/1993 |
| JP | 200276189 | A | 3/2002 |
| JP | 2003239095 | A | 8/2003 |
| JP | 2007326462 | A | 12/2007 |
| JP | 2010265491 | A | 11/2010 |
| JP | 2011501700 | A | 1/2011 |
| JP | 201377462 | A | 4/2013 |

* cited by examiner

METHOD OF MANUFACTURING AN ELECTRODE FOR A SURGE ARRESTER, ELECTRODE AND SURGE ARRESTER

This patent application is a national phase filing under section 371 of PCT/EP2015/051733, filed Jan. 28, 2015, which claims the priority of European patent application 14155575.5, filed Feb. 18, 2014, each of which is incorporated herein by reference in its entirety.

TECHNICAL FIELD

The present disclosure relates to a method of manufacturing an electrode for a surge arrester or a surge arrester, an electrode for a surge arrester and a surge arrester.

BACKGROUND

Surge arresters or comparable devices are known from DE 10 2005 036 265 A1 and DE 197 41 658 A1, for example.

Surge arresters can be used in electrical components to protect sensitive component circuits from voltage or current surges—e.g. of a nearby lightning stroke—or other unwanted discharges.

Stacked gas-filled surge arresters usually comprise arrester units being filled with gases e.g. such as noble gases. When a voltage is applied to such an arrester unit that exceeds a specific spark-over voltage, then the resistivity of the arrester unit decreases and the arrester unit becomes conducting. In other words, the arrester unit is activated. When the voltage applied to the arrester unit falls below a specific arc voltage, then the resistivity again increases and the arrester unit becomes isolating again, i.e. the arrester unit is deactivated.

Surge arresters usually connect sensitive circuits to ground. However, if the voltage level of the sensitive circuit relative to the ground potential after activating the arrester unit exceeds the arc voltage of the arrester unit, then the resistivity of the arrester unit cannot increase and the arrester unit stays in its conducting state. Thus, arrester units can be stacked—i.e. cascaded in a series configuration—to increase the possible operating voltage of the sensitive circuit.

SUMMARY OF THE INVENTION

Various embodiments provide an improved electrode for a surge arrester, whereby also the surge arrester can be improved.

One aspect relates to a method of manufacturing an electrode, e.g. for a surge arrester, or a surge arrester comprising the steps of providing an electrochemical cell with an electrode body and an electrolyte solution which is suitable for a nickel deposition, wherein the electrolyte solution comprises at least one of or more of magnesium sulphate such as $MgSO_4$, sodium sulphate such as $NaSO_4$ and/or sodium chloride (NaCl). The term "suitable" may mean that the electrolyte solution can generally be used or allows for a nickel deposition. Expediently, the electrode body may, function as a cathode in the electrochemical cell. In this respect, the electrolyte solution may further comprise a solvent and a precursor for the nickel deposition. The method further comprises electrolytically coating the electrode body with a coating comprising nickel to form the electrode for the surge arrester.

In an embodiment, the electrolyte solution and/or the coating is configured such that the surface of the coating comprises a reduced wettability. Said reduced wettability of the coating may particularly relate to a lower wettability for a solder as compared to nickel, such as to a nickel surface. The term "nickel" used as a reference in this respect, shall e.g. indicate a (reference) nickel coating which is, preferably, not a so-called dark or black nickel coating but which may be a conventional or elementary nickel coating or a bright nickel coating, possibly comprising brighteners or being deposited with the aid of brighteners.

The electrolytic coating of the electrode body may be or comprise plating such as nickel-plating of the electrode body.

In an embodiment of the method, a surface of the electrode body is made of copper (Cu). Thereby, the electrode may be made of copper as a whole. Alternatively, a bulk of the electrode body may comprise or consist of one or more, further electrode materials. An advantage of a copper electrode or an electrode comprising a copper surface is the low cost and good electrical conductivity.

In an embodiment of the method, the electrolytically applied coating is a dark nickel coating. According to this embodiment, the coating can, advantageously, be embodied such that the surface of the coating comprises a reduced wettability, such as a lower wettability for a solder as compared to nickel (see above). Particularly, the coating applied as a dark nickel coating enables the wettability of the coating to be lower for a solder, such as a hard solder, as compared to nickel. The wettability of the presented coating may, advantageously, prevent the flow of the solder from a sealing or solder joint of the arrester to an electrode or discharge gap thereof.

In an embodiment of the method, the electrolyte solution comprises nickel sulphate hexahydrate such as $NiSO_4$ with $6H_2O$ and boric acid such as $H_3BO_3$. According to this embodiment, a precursor for the nickel deposition can be provided, on the one hand. On the other hand, the boric acid may, advantageously, function as a further additive for the deposition of the coating, particularly as a solvent or a further additive.

A further aspect of the present disclosure relates to an electrode for the surge arrester comprising an electrode body and a coating. The coating is electrically conductive and comprises nickel and an additive. Expediently, the coating has metallic properties. The additive is, preferably, a non-metallic additive. Alternatively, the additive may be a metallic additive. The additive may be present in the coating in traces only. The coating, particularly the additive, is further configured such that the surface of the coating comprises a reduced wettability, such as a lower wettability for a solder as compared to nickel as mentioned above. According to this embodiment, the electrode, advantageously, allows for an improved fabrication and/or thermal capability of the surge arrester. Further, an improved soldering of the electrode to, e.g., the solder of an insulator of the surge arrester can be achieved.

A further aspect of the present disclosure relates to a surge arrester comprising the electrode.

Gas-filled surge arrester for protection of AC and DC power network against direct lightning strikes should have a high surge current capability. In particular, surge currents of the waveform 10/350 μs should be reliably arrested or discharged. The thermal load during such surges can lead to melting of the electrodes, particularly with often used copper electrodes, and/or can lead to the evaporation of electrode material. Thus, there is a significant risk of short-circuits to occur due to the reduction or narrowing of the discharge gap caused by said evaporation or by the redeposition of electrode material. Furthermore, the voltage protection level may rises due to coverage of ignition aids of the arrester (see below), e.g. at a wall of an insulator. Moreover, according to the present disclosure, the usage of expensive tungsten-copper alloys for the electrodes can, advantageously, be prevented, for example.

The aim or function of the present disclosure may be directed to the increase of the thermal capability of the arrester electrodes, particularly in a cheap and easy way.

Compared to copper, nickel has a much higher melting point (nickel: 1455° C., copper: 1085° C.) and an increased thermal stress capability. Thus, melting of the electrode or evaporation of electrode material can be avoided by the use of nickel for the electrode. The drawback of normal nickel-plated electrodes, however, is that the silver-copper alloy which may be used for the sealing of gas-filled surge arresters may have a very low viscosity on the nickel-plated surface, so that it can easily flow away from the sealing junction. In other words, the wettability of a nickel surface for silver-copper solders is normally quite high. Therefore, the risk of leaky surge arresters is increased. According to the present disclosure, this drawback can, advantageously, be avoided by the application of the presented electrode.

Additionally, said electrode allows for rendering the surge arrester less prone to damage or malfunction. For example, the capacity of the arrestor for surge currents in terms of the thermal load of the arrestor can be improved by the provision of the electrode.

A copper electrode or copper electrode surface would—due to the lower melting point or sublimation point of copper as compared to nickel—tend to the evaporation or melting of the electrode material during a large thermal or surge current load of the arrestor. This problem can be avoided by coating of the electrode with nickel. Nickel electrodes, however, pose the disadvantage that a solder comprises a significantly lower viscosity at a nickel surface, wherein the solder can easily flow or run out of the soldering area or joint. In other words, a conventional nickel surface comprises a higher wettability for the solder, e.g. a silver-copper alloy and/or eutectic, whereby the arrester may become leaky. This disadvantage can be overcome by the provision of the described coating, particularly the dark nickel coating, as the wettability of the solder can be controlled and the flowing of the solder out of the joint and e.g. into an area of the gap of the main electrodes of the arrestor can be avoided. At the same time, the advantages of a greater capacity for thermal loads and/or search currents as mentioned above can be exploited.

In an embodiment of the electrode, the coating is an electrolytically deposited layer.

In an embodiment of the electrode, the thickness of the coating ranges from 5 to 20 μm, preferably from 6 to 10 μm. This embodiment may, particularly, be expedient and advantageous in terms of an economic deposition of the electrode body or fabrication of the electrode or the surge arrester. At the same time, a continuous coating of the electrode can, advantageously, be performed.

In an embodiment of the electrode, the surface of the coating comprises a lower free electron density as compared to a nickel surface. The free electron density may, in this regard, relate to the quasi-free electron density of the respective metal. An indicator for a lower free electron density of the coating, particularly an indicator of a dark nickel coating, is the dark, grey or dull colour of the coating. The reflectivity of the coating may be correlated to the free electron density, as a material such as a metal with a usually high reflectivity usually comprises a greater free electron density. As the dark nickel coating comprises a lower reflectivity, a lower number of free electrons may be present at the surface of the dark nickel coating. Said lower free electron density of the dark nickel coating may, in turn, be correlated to the wettability of the solder on the respective surface.

In an embodiment of the electrode, the additive comprises sulphur and/or chlorine which effects the reduction or lowering of the wettability of the surface of the coating for the solder. The sulphur and the chlorine may be residues from the electrolyte solution during the manufacturing or fabrication of the electrode and/or the coating of the electrode body.

In an embodiment of the electrode, the sulphur of the additive is present in the surface of the coating between 0.05 and 0.2 weight percent.

In an embodiment of the electrode, the chlorine of the additive is present in the surface of the coating between 0.1 and 0.3 weight percent.

In an embodiment of the electrode, the contact angle formed by the solder at a temperature of 800° C. on the surface of the coating is greater than the contact angle of the solder formed on a nickel surface not comprising the additive and/or not being a dark nickel surface. Said nickel surface may be the above mentioned reference nickel. According to this embodiment, it can particularly be achieved that, even at a temperature of 800° C., the viscosity or wettability of the solder on the coating during a soldering of the electrode e.g. to an insulator of the surge arrester as mentioned above, is fairly low and a flowing or running of the solder into the discharge gap of the electrode of the surge arrester can be avoided (see above).

In an embodiment of the electrode, the coating is free of copper. This embodiment is, particularly, expedient as copper comprises a lower melting point compared to nickel and thereby the above-mentioned disadvantages of copper as an electrode material can be avoided.

In an embodiment of the electrode, the solder is a hard solder, e.g. a hard solder comprising silver (Ag) and copper (Cu). Particularly, the solder may be an alloy or eutectic compound of 72 at % of silver and 28 at % of copper. The melting point of said compound may be, or be about, 780° C. Expediently, the insulator may be provided with the solder. This embodiment allows, in combination with at least the previously described embodiment that the wettability of the solder on the coating or the electrode is moderate even at temperatures at which the electrode is soldered or connected to further components of the arrestor such as an insulator.

A further aspect of the present disclosure relates to an electrolyte solution for an electrochemical cell, the electrode solution comprising nickel sulphate hexahydrate such as $NiSO_4$ with $6H_2O$ and boric acid such as $H_3BO_3$.

In an embodiment of the electrolyte solution, the electrolyte solution comprises magnesium sulphate such as $MgSO_4$, sodium sulphate such as $NaSO_4$ and/or sodium chloride (NaCl).

A further aspect of the present disclosure relates to the coating, particularly the dark nickel coating, and the use of said coating for or for a component of the electrode for the surge arrester.

As the electrode is intended for use with the surge arrester and as the surge arrester may comprise the electrode, features which are described above and below in conjunction with the electrode may also relate to the surge arrester and vice versa. Moreover, the features mentioned in conjunction with the method may relate to those of the electrode or the surge arrester and vice versa.

BRIEF DESCRIPTION OF THE DRAWINGS

Features which are described herein above and below in conjunction with different aspects or embodiments, may also apply for other aspects and embodiments. Further features and advantageous embodiments of the subject-matter of the disclosure will become apparent from the following description of the exemplary embodiment in conjunction with the figures, in which.

DETAILED DESCRIPTION OF ILLUSTRATIVE EMBODIMENTS

Figure 1A:
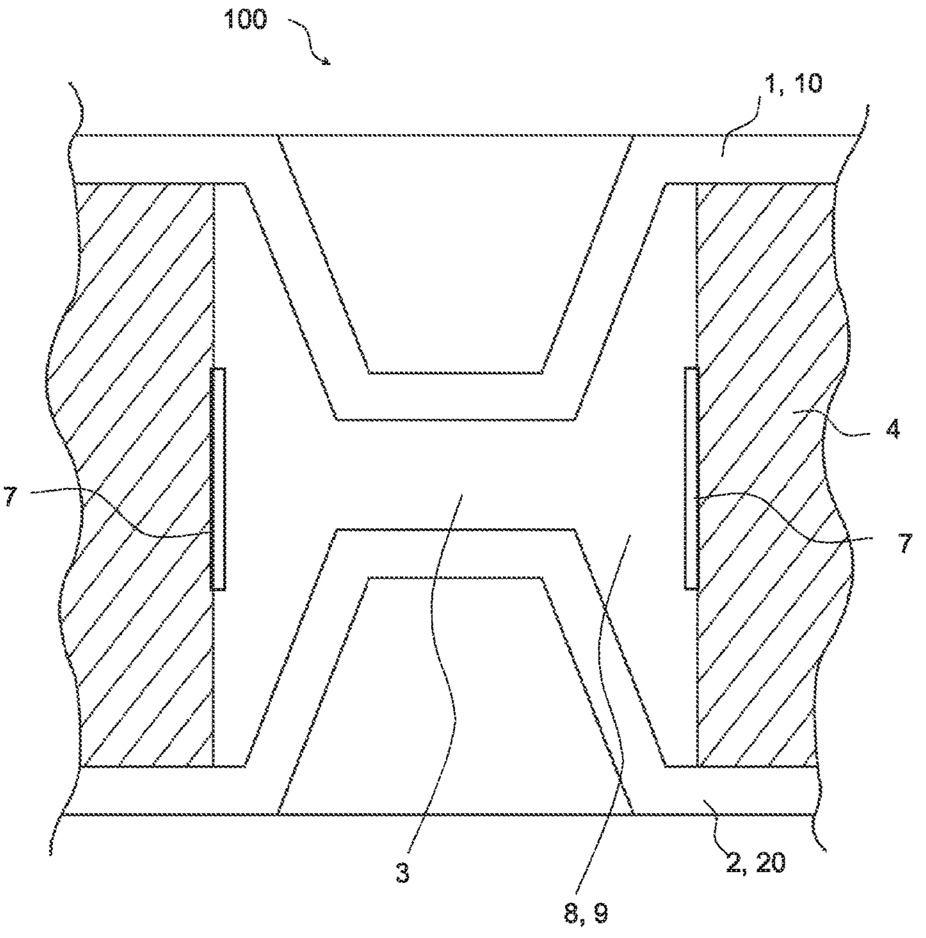
FIG. 1A shows a schematic cross-sectional view of a single unit of a surge arrester.

Like elements, elements of the same kind and identically acting elements may be provided with the same reference numerals in the figures. Additionally, the figures may be not true to scale. Rather, certain features may be depicted in an exaggerated fashion for better illustration of important principles.

FIG. 1A shows schematically a cross-section of a surge arrester 100 embodied with a single arrester unit. The surge arrester 100 comprises a first electrode 10 with a first electrode body 1 (see also below). The surge arrester 100 further comprises a second electrode 20 with a second electrode body 2 (see also below).

The first electrode body 1 and the second electrode body 2 are, preferably, made of Cu or predominantly comprise copper. Preferably, the electrode bodies have a copper surface However, said electrode bodies may also comprise further electrode materials such as a nickel/iron (NiFe) alloy or compound.

The first electrode body 1 and the second electrode body 2 are arranged symmetrically in FIG. 1A. The first electrode body 1, as well as the second electrode body 2, are configured to form a discharge or main gap 3 of the surge arrester. In the gap 3, the first electrode body 1 and the second electrode body 2 are spaced at a minimal distance from each other. The surge arrester 100 further comprises two insulators 4 or two parts of one insulator 4 which are shown in FIG. 1A. The insulators 4 may be made of a ceramic. The two insulators 4 laterally separate the first and the second electrode bodies 1, 2 in lateral areas beside the gap 3, i.e. left and right in the cross section of FIG. 1A. Originating from such an area, wherein the first electrode 1 and the second electrode 2 are separated by the insulators 4, the first and the second electrode bodies 1, 2 extend towards each other and/or towards an interior of the surge arrester 100. The first and the second electrode bodies 1, 2 are tapered in order to approach each other to form the gap 3.

The surge arrester 100 further comprises an ignition aid 7 encompassing two parts arranged at the insulators 4 and at each lateral side of the gap 3. The ignition aid 7 may be arranged on or at the insulators 4 such that the gap 3 is arranged between said ignition aid or said parts. Between the first electrode body 1 and the second electrode body 2, as well as between the insulators 4, or as the case may be, the ignition aid 7, a gas may be arranged which may be electrically dischargeable by a current pulse or current load, caused by a lightning strike e.g., during an operation of the surge arrester 100. The gas or filling gas may comprise hydrogen ($H_2$). In the case, wherein the first and second electrode bodies 1, 2 are made of a NiFe alloy, the $H_2$ of the filling gas poses disadvantages as it may be absorbed by the NiFe electrodes and said electrodes may degenerate by said absorption.

However, in the case that the first and the second electrode 1, 2 are made of copper, hydrogen is, preferably, applied as a filling or discharge gas as copper hardly absorbs hydrogen. Alternatively, nitrogen may be applied as a filling gas, wherein a larger arc or discharge voltage may be obtained during an operation of the surge arrester 100.

The arrester 100 further comprises a cavity 9. The first and the second electrode bodies 1, 2 and the insulators 4 define the cavity 9. The surge arrester 100 or the cavity 9 of the surge arrester 100 is, expediently, filled with a gas 8. Said cavity 9 is further preferably sealed and/or configured to be gas-proof.

The presented surge arrester 100 is, preferably, designed for an overvoltage or surge current protection of telecommunication devices against lightning strikes. The surge current capacity of the surge arrester may, thereby, be adjusted to a current of 4 kA and a wave form of 10/350 μs. The first value of said specification may relate to the slope or increase duration of a DC current, while the second value (350 μs) of said specification may relate to the half-life duration or half value period of the respective surge current pulse caused by the lightning strike.

Preferably, the surge arrester 100 is provisioned for a protection of devices against DC currents.

The ignition aid 7 may, particularly, ease or accelerate the process of gas discharging by a distortion of the respective electric field. Further, the average of the arc voltage or of the distribution of said voltage may be reduced by the provision of the ignition aid.

The generation of heat or heat development during the described surge current loads on the surge arrester 100 may cause the electrode material of the mentioned electrode bodies 1, 2 to melt or evaporate. Such an evaporation can cause shortcuts in the surge arrester 100 and/or the narrowing of the gap 3. Thereby, the protection level of the surge arrester 100 may be increased due to the evaporation of electrode material, wherein the ignition aid 7 and/or the insulators 4 may be coated by said electrode material.

Figure 1B:
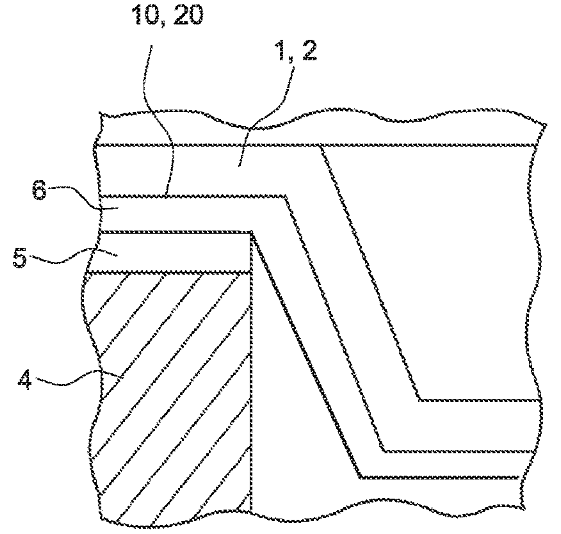
FIG. 1B shows schematically a portion of FIG. 1A in greater detail.

FIG. 1B shows a part of the surge arrester 100 shown in FIG. 1A in greater detail. Particularly, it is shown that the first electrode body 1 and/or the second electrode body 2 may comprise or be coated with a layer or coating 6. Preferably, the coating 6 extends over the whole surface of the first and the second electrode bodies 1, 2. The coating 6 is, preferably, applied to or deposited onto the first and the second electrode bodies 1, 2 by means of an electrolytic method (see below) in order to form the first and the second electrode 10, 20 of each of the electrode bodies 1, 2, respectively. Said application or deposition may pertain to a plating process.

The insulator 4 comprises a solder 5. The solder 5 may be a solder layer. In FIG. 1B, the solder 5 and the coating 6 are in contact, preferably soldered or brazed to each other such that the electrode bodies 1, 2 are mechanically connected to the insulator 4. The insulator 4 may be pre-coated or prefabricated with the solder 5. The solder 5 may be a hard solder such as an alloy of silver and copper. Preferably, the solder 5 is a eutectic compound comprising 72 at % of silver and 28 at % of copper. Said compound may have a melting point of or of about 780° C. During the fabrication of the surge arrester 100, the first and the second electrode 10, 20 are, preferably, hard soldered to the insulator 4 at a temperature of, e.g. 800° C.

Prior to the soldering, the electrode bodies 1, 2 are preferably, coated with the coating 6. The coating 6 comprises nickel. Preferably, the coating 6 is a nickel coating. Preferably, the coating 6 is, further, a dark nickel coating.

The electrode bodies 1, 2 are, preferably, electrolytically coated with the coating by means of an electrochemical cell (not explicitly shown) and an electrolyte solution (not explicitly shown) which is suitable or allows for a nickel deposition. Said coating process is, preferably, a special wet chemical electrolytic process.

The electrode bodies 1, 2, may act as a cathode during the electrolytic deposition of the coating on the electrode bodies 1, 2.

For the electrolytic deposition, the electrolyte solution, preferably, comprises at least one or more of magnesium sulphate such as $MgSO_4$ with 7 parts $H_2O$, sodium sulphate such as $NaSO_4$ and/or sodium chloride (NaCl). Preferably, the electrolyte solution further comprises nickel sulphate hexahydrate such as $NiSO_4*6H_2O$ and boric acid such as $H_3BO_3$. The nickel sulphate hexahydrate is, preferably, present at a concentration of or of about 230 g/l, while the boric acid is, preferably, present at a concentration of 40 g/l.

The coating 6 is, preferably, chosen or deposited such that the surface (not explicitly indicated) of the coating 6 comprises a lower wettability for the solder 5 as compared to nickel or a reference nickel surface, preferably at a temperature at which the electrodes are soldered to the insulator 4 during a fabrication or manufacturing of the surge arrester 100.

Preferably, the surfaces of the electrode bodies 1, 2 are made of copper.

The coating is, expediently, electrically conductive, comprises metallic electrical properties and comprises, in addition to nickel, an additive which may comprise sulphur and chlorine. The lowering of the wettability of the surface of the coating for the solder may be achieved by the presence of the additive and/or the provision of the dark nickel for the coating of the respective electrode.

The sulphur for the additive is, preferably, present in the surface of the coating between 0.05 and 0.2 weight percent. On the other hand, the chlorine in the additive is, preferably, present in the surface of the coating between 0.1 and 0.3 weight percent. Said percentages may be rendered by means of an element analysis, e.g. x-ray fluorescence. In this regard, the term "in the surface" may indicate that said elements are detectable in the coating (or a surface thereof) up or down to a thickness corresponding to the characteristic active sampling or detection thickness of said element analysis.

Preferably, the surface of the coating comprises a lower free electron density as compared to a nickel or reference nickel surface.

Preferably, the contact angle formed by the solder at a temperature of 800° C. or at that temperature at which the electrode is soldered to the insulator 4, on the surface of the coating 6, is greater than the contact angle of the solder formed on a nickel surface not comprising the additive and/or not being a dark nickel surface.

Preferably, the coating is, furthermore, free of copper. Thereby, it may be avoided that the copper of the electrode melts or evaporates as a consequence of a lightning strike or a surge current or the respective thermal load. Nickel, on the other hand, does not evaporate that easily due to the greater melting point of nickel as compared to copper. The surface roughness of the coating may further be greater or smaller than the surface roughness of the reference nickel surface not comprising the additive and/or not being a dark nickel surface, for example. The coating may further comprise a thickness between 5 and 20 μm, preferably between 6 and 10 μm. The surface of the coating 6 may further be configured such that the wettability of the coating 6 or its surface for the solder 5 is reduced or lower than the reference nickel surface. The surface of the coating 6 thereby, preferably, inherently emerges by the above-mentioned electrolytic method.

The coating 6, particularly the embodiment as dark nickel coating effects the reduced wettability of the solder 5 on the coating during the mentioned soldering such that said solder 5 does not flow or run towards a region of the gap 3 and the surge arrester 100 becomes leaky, e.g. at the lateral sides of the surge arrester 100, where the insulator 4 contacts the electrodes, respectively. Instead, as the viscosity or wettability of the solder 5 on the coating 6 is kept moderate and the advantages of a fairly high capability for surge currents or thermal loads can be exploited by the surge arrester 100.

Figure 2:
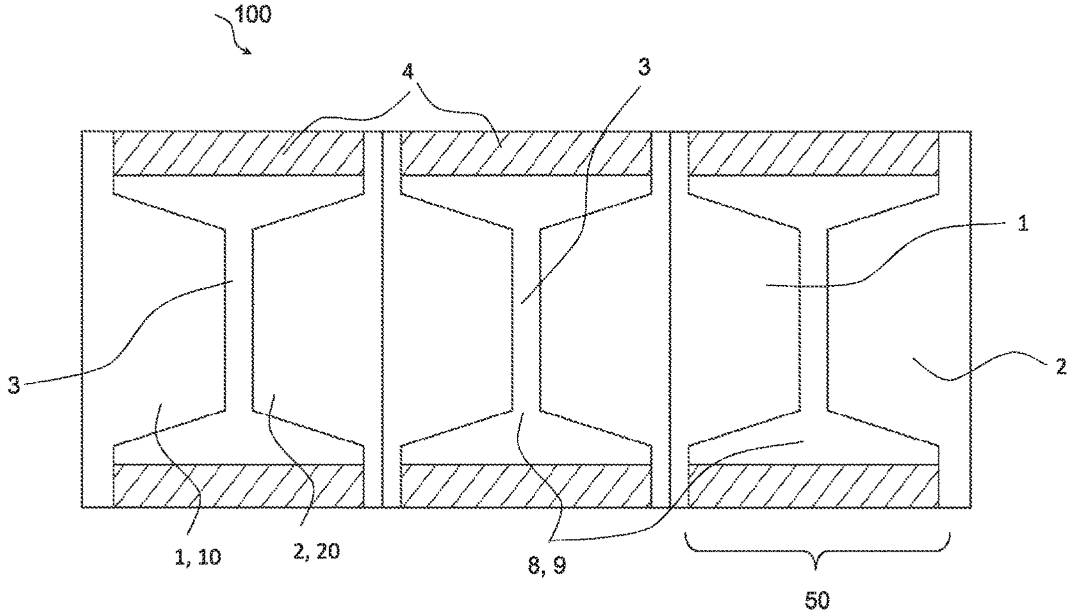
FIG. 2 shows a schematic cross-section of a stacked surge arrester.

FIG. 2 shows a schematic view of a stacked surge arrester 100. In contrast to the one shown in FIG. 1A, the surge arrester comprises a plurality of arrestor units 50 in a stacked sequence. Exemplarily, three units 50 are shown. By means of the series of cascaded configuration, the possible operating voltages of the respective circuits of the surge arrester 100 can be increased. Particularly. The possible voltage of the circuit corresponds to the number of arrestor units multiplied by the arc discharge voltage of each arrestor unit 50 in the respective embodiment.

Figure 3:
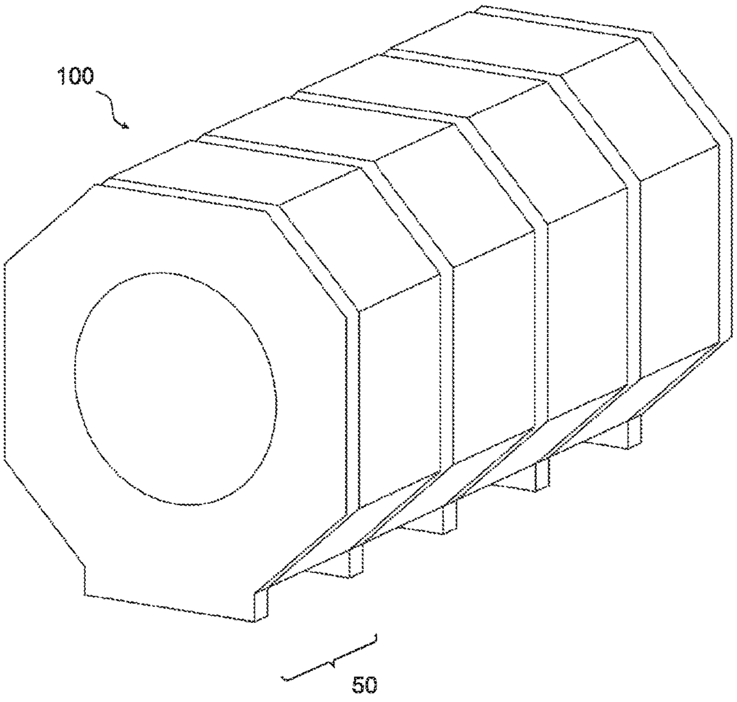
FIG. 3 shows a schematic perspective view of a stacked surge arrester.

FIG. 3 shows a perspective view of stacked surge arrester 100 comparable to the one shown schematically in FIG. 2. The surge arrester 100 comprises at least 4 arrester units 50 in a stacked sequence. The surge arrester device 100 comprises an octagonal shape and/or an octagonal front and end wall. The surge arrester 100 may further comprise one or more mounting elements (see bottom not explicitly indicated in FIG. 3) which allow for a mounting or fixation to a telecommunication device, for example.

The scope of protection is not limited to the examples given herein above. The invention is embodied in each novel characteristic and each combination of characteristics, which particularly includes every combination of any features which are stated in the claims, even if this feature or this combination of features is not explicitly stated in the claims or in the examples.

The invention claimed is:

1. An electrode for a surge arrester, comprising:

an electrode body; and a coating being electrically conductive, wherein the coating comprises nickel and an additive, wherein the coating has a surface with a reduced wettability, wherein the additive comprises sulphur, which effects the reduced wettability of the surface of the coating for a solder, and wherein the sulphur of the additive is present in the surface of the coating between 0.05 and 0.2 weight percent based on a total weight of the coating.

2. The electrode according to claim 1, wherein the coating is an electrolytically deposited layer.

3. The electrode according to claim 1, wherein the additive further comprises chlorine.

4. The electrode according to claim 3, wherein the chlorine of the additive is present in the surface of the coating between 0.1 and 0.3 weight percent based on a total weight of the coating.

5. The electrode according to claim 1, wherein the solder is a hard solder.

6. The electrode according to claim 1, wherein a contact angle formed by the solder at a temperature of 800° C. on the surface of the coating is greater than a contact angle of the solder formed on a nickel surface not comprising the additive.

7. The electrode according to claim 1, wherein the coating is free of Cu.

8. A surge arrester comprising the electrode according to claim 1.

9. A surge arrester electrode, comprising:

an electrode body; and a coating being electrically conductive, wherein the coating comprises nickel and an additive, wherein the coating has a surface with a reduced wettability when the surge arrester electrode is soldered to a surge arrester insulator, wherein the additive comprises sulphur and/or chlorine, wherein, when the additive comprises sulphur, the sulphur is present in the surface of the coating between 0.05 and 0.2 weight percent based on a total weight of the coating, and wherein, when the additive comprises chlorine, the chlorine is present in the surface of the coating between 0.1 and 0.3 weight percent based on a total weight of the coating.

10. The surge arrester electrode according to claim 9, wherein the additive comprises sulphur and chlorine.

11. An electrode for a surge arrester comprising:

an electrode body; and a coating being electrically conductive, wherein the coating comprises nickel and an additive, wherein the coating has a surface with a reduced wettability, wherein the additive comprises chlorine, which effects the reduced wettability of the surface of the coating for a solder, and wherein the chlorine of the additive is present in the surface of the coating between 0.1 and 0.3 weight percent based on a total weight of the coating.

12. The electrode according to claim 11, wherein the additive further comprises sulphur.

13. The electrode according to claim 12, wherein the sulphur of the additive is present in the surface of the coating between 0.05 and 0.2 weight percent based on a total weight of the coating.

* * * * *